United States Patent [19]

Patchen et al.

[11] 3,739,657

[45] June 19, 1973

[54] CONNECTING ROD LUBRICATION OIL HOLE

[75] Inventors: Paul J. Patchen, Chicago; Jerome L. Berti, Chicago Heights, both of Ill.

[73] Assignee: Allis-Chalmers Corporation, Milwaukee, Wis.

[22] Filed: Jan. 7, 1972

[21] Appl. No.: 216,155

[52] U.S. Cl. .................................. 74/587, 74/579 E
[51] Int. Cl. ................................................ F16c 7/02
[58] Field of Search .................... 74/587, 579 E, 579

[56] References Cited
UNITED STATES PATENTS

| | | | |
|---|---|---|---|
| 2,287,735 | 6/1942 | Halford | 74/579 E X |
| 3,361,007 | 2/1968 | Belsanti et al. | 74/587 |
| 2,890,598 | 6/1959 | Bensinger et al. | 74/579 E |

Primary Examiner—Charles J. Myhre
Assistant Examiner—F. D. Shoemaker
Attorney—Arthur L. Nelson, Robert B. Benson and Charles L. Schwab

[57] ABSTRACT

A connecting rod with a diagonal lubrication hole to improve the load carrying capacities of the rod end bearings and improve the fatigue life of the connecting rod.

10 Claims, 8 Drawing Figures

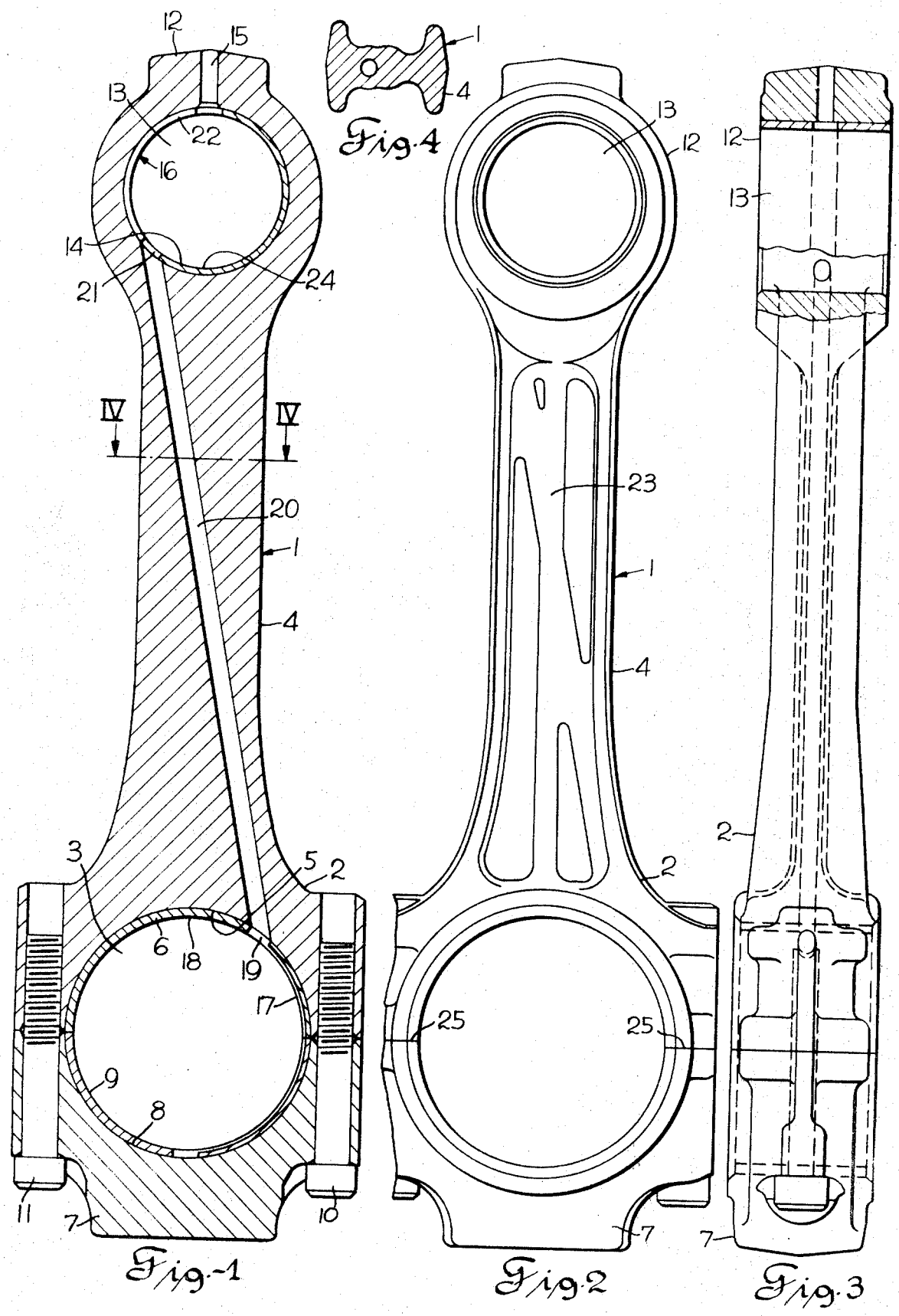

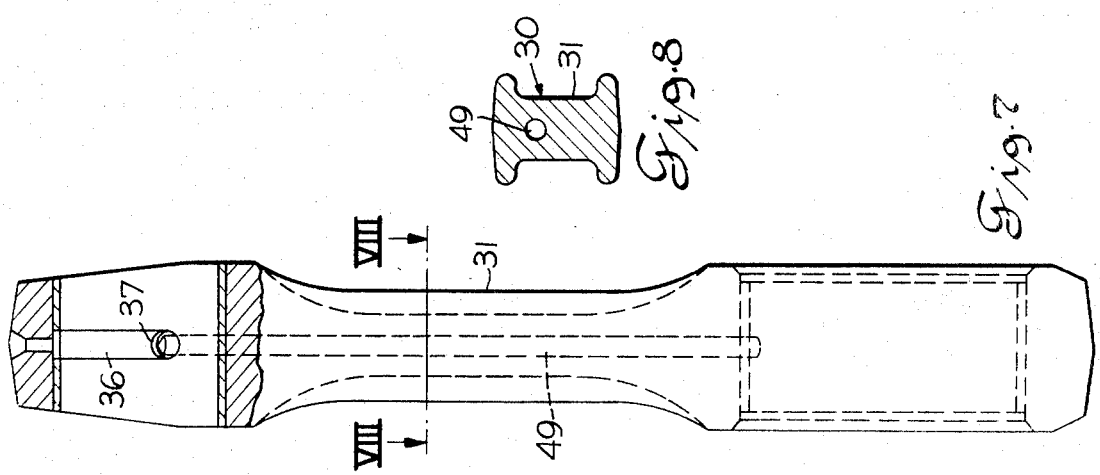
Fig. 8
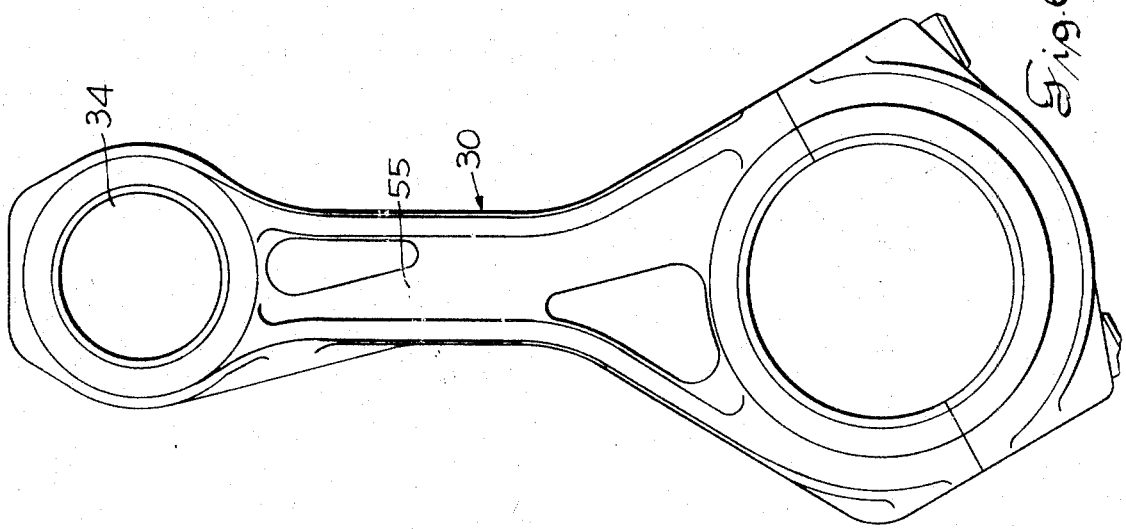
Fig. 7
Fig. 6
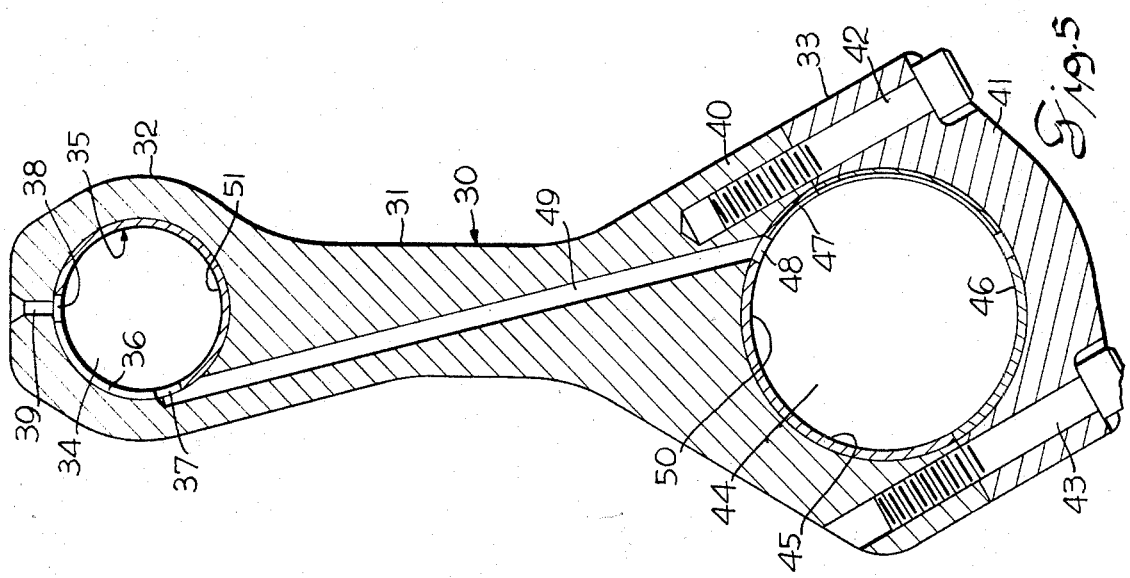
Fig. 5

CONNECTING ROD LUBRICATION OIL HOLE

This invention relates to a connecting rod and more particularly to the placement and constuction of a diagonal lubrication hole for improving the fatigue life of the connecting rod and providing maximum load carrying capacity of the rod end bearings.

The various types of connecting rods have been used in internal combustion engines with passages for transmitting lubricating fluid from the crankpin end bearing to the wrist pin end bearing for lubricating the bearings during engine operation. A portion of the lubrication oil passing through connecting rods of higher output engines may pass through a spray jet or the wrist pin end bearing to spray lubricating fluid on the underside of the piston to provide cooling of the piston. Conventional methods of lubricating the bearings on the ends of the connecting rods provides for a lubrication groove in the bearing inserts to convey lubrication around the periphery of the bearing. This method markedly detracts from the load carrying capacity by encroaching on the bearing surface and particularly at the highest load bearing area. While a lubrication groove provides added assurance that the bearings will be lubricated it is not necessary that the groove extend for the total periphery of the bearing. Accordingly, this invention provides a lubrication groove extending for a portion of the periphery of the bearing inserts to convey lubrication fluids to the bearing and permitting at the high load bearing surfaces the forming of a continuous surface for transmitting heavy thrust loads.

The conventional connecting rod having a lubrication oil hole extending longitudinally through the shank of the connecting rod is often drilled in two operations thereby forming a juncture which produces a weakness in the rod. This tends to reduce the load carrying capacity of the rod and produces a shorter fatigue life for the connecting rod. Other conventional connecting rods having the single drilled lubrication oil hole are usually drilled coincidental with the longitudinal axis of the rod. Accordingly this invention provides a diagonal drilled lubrication oil hole which intersects the longitudinal axis of the rod with the hole ends angularly displaced from the high pressure load area of the connecting rod bearing to thereby provide a rod which can carry higher loads and provide improved fatigue life.

It is an object of this invention to provide a diagonally drilled hole connecting the wristpin bore and the crank pin bore at the ends of the connecting rod.

It is another object of this invention to provide an oil hole connecting the small end bore and the large end bore of a connecting rod for an internal combustion engine with minimum encroachment of the bore surface at the high pressure load area for maximum bearing strength.

It is a further object of this invention to provide a single diagonal hole in a connecting rod eliminating the juncture of the compound hole and the associated stress connected with the compound hole to thereby improve fatigue life of the connecting rod.

It is a further object of this invention to provide a diagonally positioned oil hole in the connecting rod positioned obliquely to the longitudinal center of the connecting rod and connecting the crank pin bore and the wristpin bore at points angularly displaced from the center line of said rod.

The objects of this invention are accomplished by forming an oil hole extending longitudinally through the shank of the connecting rod and positioned at an oblique angle to the longitudinal center line of the connecting rod. The crankpin bore and the wrist pin bore include oil grooves connecting with the oil hole which avoid encroachment of the oil grooves on the high pressure area of the bearing at the axial center portion of the connecting rod. The single oil hole is formed without any juncture in the shank portion of the rod to thereby improve fatigue life and the continuous bearing surface at the high pressure load area of the connecting rod bearing provides improved performance under high load conditions.

FIG. 1 illustrates a cross section view of a connecting rod taken on a plane through the center of the connecting rod having a plane of separation for the crankpin bearing which is normal to the longitudinal axis of the connecting rod.

FIG. 2 is a side view of the connecting rod shown in FIG. 1.

FIG. 3 is a view taken at 90 degrees to the view shown in FIG. 2 with a fragmentary section of the wrist pin bearing broken away.

FIG. 4 is a cross section view taken on line IV—IV of FIG. 1.

FIG. 5 is a cross section view taken at the center of the connecting rod showing a connecting rod having a crankpin bearing having a plane of separation inclined to the longitudinal axis of the connecting rod.

FIG. 6 is a side view of the connecting rod shown in FIG. 5.

FIG. 7 is a view taken 90° to FIG. 6 with a fragmentary portion broken away at the wrist pin bearing.

FIG. 8 is a cross section view taken on line VIII—VIII of FIG. 7.

Referring to FIG. 1 the connecting rod 1 is shown in cross section. The crankpin end 2 forms a bore 3 for receiving a crankpin of a crankshaft of an internal combustion engine. The shank 4 of the connecting rod 1 forms an arcuate surface 5 receiving bearing insert 6. Likewise the cap 7 forms an arcuate surface 8 receiving a bearing insert 9. The shank end 2 and cap end 7 are fastened together by a plurality of bolts 10 and 11.

The wrist pin end 12 forms the wrist pin bore 13 which receives a bushing 14. The bushing 14 is locked by suitable means to prevent it from rotation within the bore 13. The inserts 6 and 9 also have means to prevent their rotation within the crankpin bore 3.

The wrist pin end 12 forms a spray passage 15 in communication with an oil groove 22 conveying pressurized oil from the lubrication system which is sprayed on the underside of the piston.

The crankshaft forming the crankpin which is received in the bore 3 is constructed with suitable lubricating oil transmitting passages which are in communication with the oil groove 17 as the crankpin rotates within the crankpin bearing of the connecting rod. The groove 17 extends laterally alongside of the crankpin bearing and is not formed on the high pressure load area 18. The port 19 in communication with the oil groove 17 transmits lubricating fluid to the lubrication oil hole 20 in the shank 4 of the connecting rod 1. The oil hole 20 is a single continuous passage extending through the shank of the connecting rod. The lubricating oil hole 20 is also connected to the port 21 in the bushing 16 which in turn is in communication with the oil groove 22 in the bushing 16. The extension of the imaginary center line of the oil hole 20 intersects the bore 13 in a chordal configuration as indicated in FIG. 1. The upper end of the oil groove 16 is connected to the spray passage 15.

It is noted that the oil passage 20 is formed in the reinforcement 23 of the shank 4 of the connecting rod 1. The oil groove 20 extends through the side of the wrist pin bearing while the high pressure load area 24 of the wrist pin bearing of the connecting rod 1 is a continuous surface.

The crankpin bearing of the connecting rod 1 is formed with a shank end 2 and a cap 7 which define a plane of separation 25 which is normal to the longitudinal axis of the connecting rod. The connecting rod shown in FIGS. 5, 6, 7 and 8, however, has a plane of separation defined by the shank end and cap which is oblique to the longitudinal axis of the connecting rod.

Referring to FIG. 5 the connecting rod 30 includes a shank 31 connecting the wrist pin end 32 to the crankpin end 33. The wrist pin end defines a bore 34 which receives a bushing 35 forming an oil groove 36. A bushing 35 also forms the ports 37 and 38 on opposite ends of the oil groove 36. The port 38 is connected to the spray passage 39 which is adapted for spraying pressurized lubrication oil on the other side of the piston.

The crankpin end 33 forms a two-partite bearing including the shank end 40 and the cap 41 defining arcuate surfaces. The cap 41 is fastened to the shank end by means of the bolts 42 and 43. The shank end 40 defines an arcuate segment of the bore 44 with a short portion connected to bolt 42 and a long portion connected to bolt 43. The shank end forms the crank end bore 44. The shank section of the bearing receives the bearing insert 45 while the cap receives the bearing insert 46. The inserts 45 and 46 form the lubrication groove 47. The port 48 in the short portion of the shank end 40 is in communication with the lubrication oil hole 49. The oil groove 47 is essentially positioned on the side of the crank pin bore 44. The port is angularly spaced from the high pressure surface 50 of the crankpin bearing.

The lubrication oil hole 49 extends through the shank 31 of the connecting rod 30 and connects to the port 37 of the wrist pin end 32 at substantially the point of tangency defined by the axis of the oil lubrication hole 49 and bore 34. The high pressure surface 51 of the bushing 35 of the wrist pin end bearing is substantially removed from the port 37 and oil groove 36. It can be seen that the connecting rod 30 will transmit substantially more load by this construction as there is minimum encroachment on the bearing surface in the high pressure load area by the oil groove at either the crankpin bearing or the wrist pin end bearing.

ReferrinG to FIG. 6, it is noted that the reinforcement ridge 55 extends diagonally with the longitudinal axis of the connecting rod 30. The lubrication oil hole 49 is drilled through this ridge 55 of the connecting rod.

The oil lubrication oil hole 49 is shown in FIG. 7 and FIG. 8. The plane of the cross section shown in FIG. 5 is taken through the center of FIG. 7 and the connecting rod is symmetrical on both sides of the plane. FIG. 8 is a cross section showing the lubrication oil hole 49 and its relative position in the shank 31.

The connecting rod operates as follows. The crankpin end 2 is connected to the crankpin of a crankshaft. The wrist pin end 12 is connected to a wrist pin which in turn is connected to a piston. The crankshaft is provided with suitable lubricating oil passages in communication with the oil groove 17 which supplies pressurized lubricating oil to the groove and the oil hole 20 and groove 22 of the wrist pin end. When the engine is in operation, pressurized lubricating oil is sprayed through the spray passage 15 on the other side of the piston. The maximum thrust of the engine is transmitted longitudinally through the connecting rod. The wrist pin bears on the high pressure load area 24 of the bushing 14 for transmitting a driving force through the connecting rod 1. The force is also transmitted from the connecting rod 1 to the crankpin with the high pressure area 18 transmitting the greatest thrust to the crankpin. These areas of the bearings on the crankpin and the wrist pin are continuous and will provide greater power transmission. The lubricating oil passage 20 is connected to the groove 17 in such a manner that there is no encroachment on the bearing surface which receives the maximum pressure as the load is transmitted through the connecting rod.

The lubricating oil hole 20 is a single straight passage intersecting the center line of the shank portion of the connecting rod 1. The lubrication hole is a single continuous smooth peripheral hole so that there is no juncture in the passage which may produce stress concentration and tend to reduce the fatigue life of the connecting rod. A smooth continuous passage as shown defining the lubricating oil hole 20 improves the fatigue life of the connecting rod. FIGS. 1, 2, 3 and 4 illustrate one form of the connecting rod while FIGS. 5, 6, 7 and 8 illustrate a modified form of a connecting rod which will improve the load carrying capacities of the connecting rod by the unique bearing construction on the crankpin end of the connecting rod.

The embodiments of the invention in which an exclusive property or privilege is claimed are defined as follows:

1. A connecting rod comprising a crankpin end, a wrist pin end and a shank connecting said ends, said crankpin end defining a crankpin bore, said wrist pin end defining a wrist pin bore, said shank defining a straight lubricating oil hole disposed diagonally with the longitudinal center line of said connecting rod, port means in said crankpin bore communicating with said lubricating oil hole and angularly spaced in said bore from said center line, port means in said wrist pin bore communicating with said lubricating oil hole and angularly spaced in said bore to the opposite eide of said center line from said port means in said crankpin bore thereby providing a continuous smooth periphery in said hole to extend fatigue life of said rod and provide continuous bearing surface at the high pressure areas of said bores adjacent the longitudinal center line of said rod.

2. A connecting rod as set forth in claim 1 including means defining a spray passage on the wrist pin end of said connecting rod adapted for spraying lubricating oil axially from the wrist pin end of said connecting rod.

3. A connecting rod as set forth in claim 1 wherein said shank defines said lubricating oil hole in communication with at least one of said bores through said port means at essentially a point of tangency of said oil hole with said bore.

4. A connecting rod as set forth in claim 1 wherein said shank defines said lubricating oil hole connected with at least one of said bores wherein the extension of the axis of said lubrication oil hole forms a chordal configuration with at least one of said bores.

5. A connecting rod as set forth in claim 1 wherein said crankpin end defines a two piece bearing including a shank end defining an arcuate surface and a cap defining a mating arcuate surface to define a plane of separation normal to the longitudinal axis of said rod.

6. A connecting rod as set forth in claim 1 wherein said crankpin end defines a two-partite type bearing including a shank end defining an arcuate surface and a cap defining a mating arcuate surface, said two-partite type bearing defines a plane of separation incline to the longitudinal axis of said connecting rod.

7. A connecting rod as set forth in claim 6 wherein said shank defines a short portion and a long portion defining said arcuate surface, said shank defines said lubrication oil hole extending into said short portion of said crankpin end of said connecting rod.

8. A connecting rod as set forth in claim 1 wherein said rod defines a longitudinal axis and said lubricating oil hole derines an axis with said axes lying in a plane perpendicular to the axes of said bores.

9. A connecting rod as set forth in claim 8 wherein said rod defines symmetrical halves on opposing sides of said plane.

10. A connecting rod as set forth in claim 1 wherein each rod end includes at least one bearing insert defining a lubrication oil groove in communication with said lubricating oil hole and extending angularly in said bore on the lateral portion of said rod.

* * * * *